United States Patent Office 2,848,463
Patented Aug. 19, 1958

2,848,463

STEROID SUBSTANCES AND PROCESS FOR PRODUCING SAME

Thomas Walker, South Harrow, Patrick Gadsden Jones, Hillingdon, and John Christopher Hamlet, Pinner, England, assignors to G. N. R. D. Patent Holdings Limited, London, England, a British company No Drawing. Application July 6, 1954
Serial No. 441,686

Claims priority, application Great Britain July 13, 1953

12 Claims. (Cl. 260—397.45)

This invention is concerned with improvements in or relating to the preparation of 3-keto-2-iodo-$\Delta^4$-steroids from 3-keto-2:4-dibromoallosteroids and the preparation of 3-keto-$\Delta^4$-steroids from the said 3-keto-2-iodo-$\Delta^4$-steroids.

It will be appreciated that cortisone contains the 3-keto-$\Delta^4$-structure and accordingly where the 3-keto-2:4-dibromoallosteroids used as starting materials in the present process have an 11-keto group and the cortisone sidechain or derivative thereof, for example having 21- or 17- and 21-ester groups, the present process leads to the production of cortisone or its derivatives. The present process is therefore valuable in the synthesis of cortisone. The formation of the 3-keto-$\Delta^4$-structure is also of importance in the synthesis of other steroids of physiological importance.

The conversion of 3-keto-2:4-dibromoallosteroids into 3-keto-2-iodo-$\Delta^4$-steroids by reaction with sodium iodide in acetone and the reduction of this latter type of compound by chromous chloride, collidine or zinc, to the 3-keto-$\Delta^4$-structure has been described by Rosenkranz, Mancera, Gatica and Djerassi (J. Amer. Chem. Soc., 1950, 72, 4077). In a later publication, Rosenkranz, Djerassi, Yashin and Pataki (Nature, 1951, 168, 28) have described the application of this process to the preparation of cortisone-21-acetate from 21-acetoxy-2:4-dibromo-17-hydroxy-3:11:20-triketoallopregnane.

In applying the process described by the above authors we have found that the final product, after removal of the halogen, contained a large amount of reduced compounds, that is 3-keto-4:5-dihydroallosteroids. It is important to avoid the formation of such reduced by-products, for not only is the yield of the required 3-keto-$\Delta^4$-compounds reduced, but their separation from the corresponding reduced compounds is, in general, a matter of some practical difficulty. We have also found that the reduction of the halogens from positions 2 and 4 may be brought about by hydrogen iodide and that it is the presence of this substance in the reaction mixture, liberated during the conversion of the 3-keto-2:4-dibromoallosteroid to the 3-keto-2:4-dibromoallosteroid to the 3-keto-2-iodo-$\Delta^4$-steroid, which gives rise to the formation of the 3-keto-4:5-dihydroallosteroids.

We have now found that increased yields of the desired 3-keto-$\Delta^4$-steroids may be obtained in the above-described process if a substance is present during the conversion of the starting materials to the 3-keto-2-iodo-$\Delta^4$-steroids with which the hydrogen iodide liberated in this conversion will react in preference to the steroid.

Suitable compounds for this purpose are organic compounds having in their structure an iodine atom which can react readily with hydrogen iodide with formation of iodine according to the equation $RI+HI \rightarrow RH+I_2$, where R is an organic residue. Organic iodine compounds which can readily react with hydrogen iodide in this way will in general be those wherein the iodine atom is activated by the presence of electron attracting groups in the organic residue and suitable compounds are, for example, iodoacetone and allyl iodide. As to whether an organic compound is suitable for the present process can obviously be easily ascertained by a preliminary experiment, for example merely by adding hydrogen iodide to the compound under test in a solvent and noting whether iodine is liberated more rapidly than with the steroid compounds.

In the process according to the invention however it is generally most convenient to generate the organic iodine compound in situ by having present during the reaction an organic substance having an active chlorine or bromine atom which can react readily with an alkali metal iodide with replacement of the chlorine or bromine atom by iodine. In this case the chloro- or bromo-compound first reacts with some of the excess alkali metal iodide present in the reaction mixture to give the corresponding iodo-compound which latter then reacts preferentially with the hydrogen iodide liberated in the formation of the 3-keto-2-iodo-$\Delta^4$-steroid.

An example of a suitable compound which may be used in the present process is allyl bromide. However, we prefer to use $\alpha$-halogeno ketones of the general formula

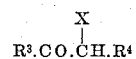

where $R^3$ is an alkyl radical containing from 1-4 carbon atoms, $R^4$ is hydrogen or an alkyl radical containing from 1-3 atoms and X is chlorine, bromine or iodine.

According to the invention therefore we provide a process for the preparation of 3-keto-2-iodo-$\Delta^4$-steroids by treatment of 3-keto-2:4-dibromoallosteroids with an alkali metal iodide soluble in the reaction medium in which the said treatment is carried out in the presence of an organic iodine compound which under the condition of the said treatment, can react with hydrogen iodide with the formation of iodine.

According to a feature of the present invention, the said treatment is carried out in the presence of a compound containing an active chlorine or bromine atom which can readily be replaced by an iodine atom, the resulting iodo compound being capable of reacting with the hydrogen iodide liberated in the formation of the said 3-keto-2-iodo-$\Delta^4$-steroids, under the conditions of the said treatment.

According to a further feature of the invention the said 3-keto-2-iodo-$\Delta^4$-steroids are converted by reduction into 3-keto-$\Delta^4$-steroids.

According to yet another feature of the invention the said treatment is carried out in the presence of an $\alpha$-halogeno ketone of the general formula

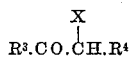

where $R^3$ is an alkyl radical containing from 1–4 carbon atoms, $R^4$ is hydrogen or an alkyl radical containing from 1–3 carbon atoms and X is chlorine, bromine or iodine.

We find that the presence of halogeno compounds as described in the treatment of the steroid starting materials results in an increased overall yield of the 3-keto-2-iodo-$\Delta^4$-compounds with resulting increased overall yield of the 3-keto-$\Delta^4$-steroids indicated by the increased intensity of absorption at 238 m$\mu$: the fact that the mode of action of the halogeno compound is by preferential reaction of an iodo compound with the hydrogen iodide is shown by the fact that under appropriate conditions the iodine content of the intermediate 3-keto-2-iodo-$\Delta^4$-compounds approaches more nearly the theoretical figure.

The reaction may be carried out in a variety of solvents; suitable solvents being, for example, acetone, methylethyl ketone, tertiary butanol, tetrahydrofuran and methyl cyanide, of which we prefer acetone. When a ketonic solvent is used it is most convenient to use the α-bromo-derivative of such a ketone to promote the formation of the desired unsaturated compounds, since the bromo-ketone may be conveniently produced in situ by the addition of the requisite amount of bromine to the solvent, and also because the halogenated ketone is reduced back to the starting material, that is the ketonic solvent, during the final, reduction, stage of the process and thus a mixed solvent is avoided.

Thus we prefer to use acetone as the solvent and bromacetone as the said compound containing an active chlorine or bromine atom. We also prefer to use 1 to 5 molecular proportions of such halogenated ketones per molecular proportion of steroid starting material and to carry out the said iodide treatment at temperatures between 50° and 100° C.

We also prefer that the said alkali metal iodide should be sodium iodide, as this is soluble in the organic solvents preferably used in the process according to the invention.

It will be appreciated that the process according to the invention represents an improvement on the process described by Rosenkranz et al. (loc. cit.) and accordingly the various other conditions under which the process should preferably be carried out are as described by the above authors.

In using the process according to the invention in the synthesis of cortisone, we prefer to prepare compounds in which the 21- or 17- and 21-hydroxyl groups are esterified, that is we prefer to use the 21-esters or 17:21-diesters of 17α:21-dihydroxy-2:4-dibromo-3:11:20-triketo-allopregnane as starting materials. Such starting materials may be prepared in any convenient manner, for example as described in co-pending applications Serial No. 424,500 and Serial No. 428,804.

According to a modification of the invention, therefore, a 21-ester or 17:21-diester of 17α:21-dihydroxy-2:4-dibromo-3:11:20-triketoallopregnane is used as the starting material.

In order that the invention may be well understood, the following examples are given by way of illustration only:

EXAMPLE 1

*Comparative experiments on the conversion of 17α:21-diacetoxy-2:4-dibromo-3:11:20-triketoallopregnane into cortisone diacetate*

(a) *Without the use of bromacetone.*—A solution of 17α:21-diacetoxy-2:4-dibromo-3:11:20-triketoallopregnane (5 g.) and sodium iodide (12.5 g.) in acetone (250 ml.) was refluxed for 2½ hours. The residue was then evaporated to approximately half its original volume, poured into excess aqueous sodium thiosulphate solution, and extracted with methylene chloride. The methylene chloride extracts were washed with sodium thiosulphate solution and water, dried over anhydrous magnesium sulphate, and the solvent evaporated under reduced pressure at room temperature. The residue was taken up in acetone (250 ml.) and excess chromous chloride solution added. After half an hour at room temperature, the mixture was again evaporated to half its original volume, poured into water and extracted with methylene chloride. The extracts were washed with sodium bicarbonate solution and water, dried over anhydrous magnesium sulphate and the solvent removed under reduced pressure to give the crude product. Wt.=3.4 g. (93% by weight). $[\alpha]_D+92°$ (CHCl$_3$). λ max. 238 mμ, $$E^{1\%}_{1cm.}=210$$

(b) *Using bromactone.*—Bromine (0.85 ml.) was added to acetone (100 ml.) and when the solution decolourised, anhydrous sodium carbonate was added and the mixture shaken. Further small batches of sodium carbonate were added over the next ½ hour, with occasional shaking. The mixture was filtered, and a solution of sodium iodide (25 g.) in acetone (100 ml.) added to the filtrate. The mixture was refluxed for ½ hour, cooled, and 17α:21-diacetoxy-2:4-dibromo-3:11:20-triketoallopregnane (5.0 g.) in acetone (50 ml.) added, and the solution refluxed for a further 5 hours. The product was worked up and treated exactly as described above under (a), to give a crude product. Wt.=3.4 g. (93% by weight). $[\alpha]_D+106°$ (CHCl$_3$). λ max. 238 mμ, $$E^{1\%}_{1cm.}=250$$

(c) *Using allyl bromide.*—2:4-dibromodihydroallocortisone diacetate (1 g.) was refluxed with sodium iodide (5 g.) in acetone (50 ml.) containing allyl bromide (1.45 ml.) for 2½ hours. The iodine colour was discharged with N/10 thiosulphate, water added, the iodo-steroid extracted with methylene chloride and after evaporation of the solvent the product dissolved in acetone (50 ml.) and treated with an excess of chromous chloride for ½ hour at room temperature. Evaporation of the solvent and addition of water gave crude cortisone acetate (0.63 g.), λ max. 238 mμ, $$E^{1\%}_{1cm.}\ 221,\ [\alpha]_D+111\ (CHCl_3)$$

EXAMPLE 2

*Comparative experiments on the conversion of 21-acetoxy-17-hydroxy-2:4-dibromo-3:11:20-triketoallopregnane into cortisone acetate*

(a) *Without the use of bromacetone.*—21-acetoxy-17-hydroxy-2:4-dibromo-3:11:20-triketoallopregnane (20.0 g.) in acetone (1 l.) containing sodium iodide (80 g.) was refluxed 4½ hours. One third of the solvent was then removed and sufficient of an aqueous solution of sodium thiosulphate was added to remove the colour of the iodine. The colourless solution was diluted with water and extracted with methylene chloride. The organic layer was well washed with water and yielded a white solid on evaporation to dryness. This material showed an ultra-violet absorption maximum at 240 mμ, $$E^{1\%}_{1cm.}\ 206\ (alcohol)$$

Iodine content 14.98%, C$_{23}$H$_{29}$O$_6$I requires I, 24.0%.

The above material (the 2-iodo compound) in acetone (750 ml.) was treated with excess chromous chloride solution (200 ml.; 1.3 N solution) under nitrogen and allowed to stand 30 minutes at room temperature. The solution was diluted with water and extracted with ethyl acetate, the organic layer being then washed with water, dried, and evaporated yielding a white crystalline mass (12.9 g.) M. P. 205–10°, $[\alpha]_D^{20}+175°$ (c., 0.71 in CHCl$_3$) and showing an ultra-violet absorption maximum at 238 mμ, $$E^{1\%}_{1cm.}\ 242\ \text{in alcohol}$$

(b) *Using bromacetone.*—21-acetoxy-17-hydroxy-2:4-dibromo-3:11:20-triketoallopregnane (20.0 g.) in acetone (1 l.) containing sodium iodide (100 g.) and bromacetone (9.8 g.) was refluxed 4½ hours. One third of the solvent was then removed and sufficient of an aqueous solution of sodium thiosulphate was added to remove the colour of the iodine. The colourless solution was diluted with water and extracted with methylene chloride. The organic layer was well washed with water and yielded a white solid on evaporation to dryness. This material showed an ultra-violet absorption maximum at 239 mμ, $$E^{1\%}_{1cm.}\ 205\ (alcohol)$$

Iodine content 18.4%, C$_{23}$H$_{29}$O$_6$I requires I, 24.0%.

The above iodocompound in acetone (750 ml.) was treated with excess chromous chloride solution (200 ml.; 1.3 N solution) under nitrogen and allowed to stand 30 minutes at room temperature. The solution was diluted with water and extracted with ethyl acetate the organic layer being washed with water, dried and evaporated, yielding a white crystalline mass (14.3 g.)

M. P. 211–20°, $[\alpha]_D^{20}$ +179°. Ultra-violet absorption maximum at 238 m$\mu$,

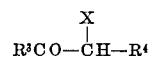 275 in alcohol

EXAMPLE 3

(a) *Without the use of bromo-methyl ethyl ketone.*—2:4-dibromodihydroallocortisone acetate (0.5 g.) in methyl ethyl ketone (35 ml.) containing sodium iodide (2.0 g.) was refluxed for 5½ hours. The iodine colour was then removed by addition of N/10 sodium thiosulphate solution (27 ml.) and the iodo-steroid precipitated by the addition of water. The product was taken up in acetone (35 ml.) and treated with a 50% excess of chromous chloride solution for ½ hour under nitrogen at room temperature. The solution was then extracted with ethyl acetate, the organic layer washed with water and then evaporated yielding crude cortisone acetate (220 mg.), λ max. 239 m$\mu$,

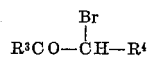 214

(b) *Using bromo-methyl ethyl ketone.*—2:4-dibromodihydroallocortisone acetate (0.5 g.) in methyl ethyl ketone (25 ml.), containing sodium iodide (2.0 g.) and bromo-methyl ethyl ketone (2.0 moleculiar equivalents) was refluxed for 4½ hours. The free iodine was titrated with N/10 sodium thiosulphate solution (26.2 ml.) and the steroid precipitated by the addition of water. The product was taken up in acetone (25 ml.) and treated with a 50% excess of chromous chloride solution for ½ hour under nitrogen at room temperature. The solution was extracted with ethyl acetate and the organic layer washed with water and evaported to yield crude cortisone acetate, λ max. 238 m$\mu$, $E_{1\,cm.}^{1\%}$ 290, $[\alpha]_D^{20}$ +195° (CHCl$_3$)

We claim:

1. In a process for the preparation of a lower alkanoic acid ester of cortisone which comprises reacting the corresponding ester of 17$\alpha$:21-dihydroxy-2:4-dibromo-3:11:20-triketoallopregnane with an alkali metal iodide to produce the corresponding 2-iodo-3-keto-$\Delta^4$-steroid and reacting the last-named steroid compound with a reducing agent, the step of carrying out the reaction of said 2:4-dibromoallosteroid with said alkali metal iodide in the presence of an organic compound selected from the group consisting of allylbromide and a compound of the general formula $$R^3CO-\overset{X}{\underset{|}{C}H}-R^4$$

where R$^3$ is an alkyl radical containing from 1–4 carbon atoms, R$^4$ is selected from the group consisting of a hydrogen atom and an alkyl radical containing from 1–3 carbon atoms and X is selected from the group consisting of chlorine, bromine and iodine atoms.

2. A process as claimed in claim 1 in which said organic compound is allylbromide.

3. The process of claim 1 in which said organic compound has the general formula $$R^3CO-\overset{Br}{\underset{|}{C}H}-R^4$$

4. The process of claim 3 in which said organic compound is bromacetone.

5. The process of claim 3 in which said organic compound is bromo-methyl ethyl ketone.

6. A process as claimed in claim 1 in which the said treatment is carried out in a solvent comprising at least one compound selected from the groups consisting of acetone, methyl ethyl ketone, tertiary butanol, tetrahydrofuran and methyl cyanide.

7. A process as claimed in claim 3 wherein X is bromine and the solvent employed is the corresponding unbrominated ketone of formula R$^3$—COCH$_2$—R$^4$.

8. A process as claimed in claim 1 in which the said reaction is carried out in the presence of from 1 to 5 molecular proportions of the said organic compound per molecular proportion of steroid starting material.

9. A process as claimed in claim 1 in which the said reaction is carried out at a temperature between 50° and 100° C.

10. A process as claimed in claim 1 in which the alkali metal iodide is sodium iodide.

11. The process of claim 1 in which said lower alkanoic acid ester is cortisone acetate.

12. The process of claim 1 in which said lower alkanoic acid ester is cortisone diacetate.

References Cited in the file of this patent

Rosenkranz et al.: Journal Am. Chem. Soc. 72, 1046, 4077–4080 (1950).

Rosenkranz et al.: Nature 168, 28 (1951).